Patented Aug. 24, 1943

2,327,868

UNITED STATES PATENT OFFICE 2,327,868

TREATMENT OF GLASS SURFACES

Walter E. Campbell, Tarentum, Pa., assignor to Pittsburgh Plate Glass Company, Allegheny County, Pa., a corporation of Pennsylvania No Drawing. Application August 28, 1941,
Serial No. 408,653

5 Claims. (Cl. 41—40)

The present invention relates to a process of treating glass surfaces and more particularly to a process of flaking or chipping the surface of glass.

One object of the invention is to provide a process whereby a glass surface may have imparted thereto roughened portions conforming to a suitable design occasioned by removal from the surface of chips of glass.

A second object of the invention is to provide a process in which a treated glass surface will be chipped more uniformly than has heretofore been possible.

Other objects and advantages of the invention will become more apparent from the following detailed description of a preferred embodiment thereof.

For many years it has been the custom to decorate glass surfaces by applying thereto a film of glue or other adhesive, which on heating dries and contracts to detach particles of glass from the coated surface. This process, which is sometimes termed vitreography, is still in use for it produces a peculiar effect on glass surfaces which cannot be obtained by other means. Unfortunately, however, it is difficult to control the heating and drying, in order that the chipping of the glass will be uniform, of equal intensity and brightness throughout.

I am aware that the art is replete with suggestions for improving the chipping operation through the use of contracting adhesives, but in the main these have been restricted to means for confining the chipping action to desired locations, as for example, in the production of designs upon the glass surfaces. In every instance, so far as I am aware, the steps of the chipping operation have followed the basic principle, that is the use of heat to dry an adhesive coating to set up therewithin a contracting action.

Briefly stated, the present invention contemplates a chipping operation in which a glass surface coated with an adhesive is subjected to reduced temperatures to facilitate elimination of moisture, drying of the adhesive film and an accompanying chipping of the glass.

In carrying out my improved process, a film of adhesive is applied to that portion of a glass surface which it is desired to chip. To insure maximum contact between the adhesive and glass, essential to good chipping, the glass may be sandblasted or acid etched before the adhesive is applied thereto. This preliminary treatment is not necessary in all cases. For example, the adhesive may be brushed on the glass in such manner as to eliminate the film of air or grease spots which would tend to prevent a satisfactory bond between the adhesive layer and the glass. The use of varnish or other masking agents, to restrict the adhesive to a particular area to form a design, may be employed as is customary in the art. The adhesive may be the common cabinet maker's glue which is heated to bring it to fluid consistency for ease of application or it may be a cold water glue. The thickness of the applied adhesive layer may be varied within relatively wide limits, depending upon the depth it is desired to create in the chipped portion of the glass. A heavier adhesive layer removes heavier chips of glass from the treated surface than will a thin layer of adhesive.

The treated glass surfaces are then subjected to reduced temperatures induced, for example, by mechanical refrigeration. It has been ascertained that a temperature of approximately 10° below zero F. is sufficient for the intended purpose. Under the conditions of the reduced temperatures the humidity of the atmosphere surrounding the adhesive coated plates is reduced to a minimum. Obviously therefore the moisture content of the adhesive layer is rapidly reduced and the adhesive will dry uniformly. Upon drying and setting the adhesive layer contracts and this action flakes or chips the glass surface underneath.

A contraction of the adhesive layer upon setting not only chips the glass but also causes a disintegration of the adhesive layer, freeing it from the glass. The time interval for setting of the adhesive will depend, of course, upon the amount of moisture contained within the adhesive layer and the thickness of that layer. Under ordinary conditions three or four hours will be sufficient for completion of the chipping operation. It will be understood that the process may be speeded up by reducing the temperature within the refrigerators. Ordinarily, however, the added cost of increased refrigeration will not warrant its use.

The process is applicable to plane or curved glass surfaces and the chipping action results equally as well in either case. The dried adhesive carrying the glass chips may be remelted and used in the treatment of other glass articles.

It has been ascertained that the drying and contracting of the adhesive layer is accomplished more uniformly under reduced temperatures and accordingly the chipped surface will have a more uniform pattern and a more attractive appearance than has been heretofore possible with the ordinary methods.

It will at once be obvious that various modifications in the nature of the described process will be possible without departing from the spirit of the invention or the scope of the appended claims.

What I claim is:

1. A process of treating a glass surface, which comprises applying a film of adhesive to the glass surface and subjecting the treated surface to temperatures reduced sufficiently to cause chipping off of adhesive and glass therefrom.

2. A process of treating a glass surface, which comprises applying a layer of adhesive thereto and subjecting the treated surface to a temperature of approximately 10° below zero F. to set the adhesive.

3. A process of treating a glass surface, which comprises sand-blasting the surface, applying a layer of glue thereto and subjecting the treated surface to a temperature of approximately 10° below zero F. to set the glue, and to cause chipping of the glass.

4. A process of treating glass which comprises coating a glass surface with a film of adhesive, and exposing said coated surface to a mechanically refrigerated atmosphere sufficiently chilled to condense the moisture in said atmosphere and for a period of time sufficient to disintegrate said adhesive into flake form and cause chipping off of portions of said coated surface.

5. A process of treating glass which comprises coating a glass surface with a film of adhesive, drying and contracting said adhesive by subjecting the coated surface to a refrigerated atmosphere sufficiently chilled to remove substantially the humidity in the atmosphere along said surface and for a period of time sufficient to cause chipping off of surface portions of the coated glass.

WALTER E. CAMPBELL.